United States Patent
Gaist et al.

(10) Patent No.: US 9,876,727 B2
(45) Date of Patent: Jan. 23, 2018

(54) PHYSICAL-LAYER SIGNALING OF FLOW CONTROL UPDATES

(71) Applicant: Mellanox Technologies TLV Ltd., Ra'anana (IL)

(72) Inventors: Chen Gaist, Tel Aviv (IL); Ran Ravid, Tel Aviv (IL); Liron Mulla, Ramat Gan (IL); Avner Hadash, Kfar Saba (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 147 days.

(21) Appl. No.: 14/664,944

(22) Filed: Mar. 23, 2015

(65) Prior Publication Data
US 2016/0285776 A1 Sep. 29, 2016

(51) Int. Cl.
*H04L 12/801* (2013.01)
*H04L 12/835* (2013.01)
*H04L 12/841* (2013.01)
*H04L 1/00* (2006.01)

(52) U.S. Cl.
CPC ............... *H04L 47/35* (2013.01); *H04L 1/00* (2013.01); *H04L 47/28* (2013.01); *H04L 47/34* (2013.01)

(58) Field of Classification Search
CPC .................... H04L 47/28; H04L 47/35
See application file for complete search history.

(56) References Cited

U.S. PATENT DOCUMENTS

2003/0174642 A1* 9/2003 Yang ............... H04J 13/0048
                                                       370/209
2009/0241002 A1* 9/2009 Ko ..................... H04L 1/0009
                                                       714/749

(Continued)

OTHER PUBLICATIONS

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

(Continued)

*Primary Examiner* — Michael Thier
*Assistant Examiner* — Brian Cox
(74) *Attorney, Agent, or Firm* — D.Kligler IP Services Ltd.

(57) ABSTRACT

A method for communication includes transmitting a sequence of outgoing data blocks from a network node over a communication link to a peer node, and receiving incoming data blocks from the peer node. A control field is added in a predefined location in each of the outgoing data blocks in the sequence by the network node. In at least a first subset of the outgoing data blocks in the sequence, the control field contains error control information, which is capable of causing the peer node to retransmit one or more of the incoming data blocks to the network node, while in at least a second subset of the outgoing data blocks in the sequence, disjoint from the first subset, the control field contains a flow control instruction, configured to cause the peer node to alter a rate of transmission of the incoming data blocks over the link.

16 Claims, 3 Drawing Sheets

(56) References Cited

U.S. PATENT DOCUMENTS

| | | | | |
|---|---|---|---|---|
| 2014/0293889 A1* | 10/2014 | Mahr | ................... | H04L 1/1825 |
| | | | | 370/329 |
| 2014/0362867 A1* | 12/2014 | Tanimoto | ................ | H04L 47/32 |
| | | | | 370/412 |
| 2015/0236823 A1* | 8/2015 | Djukic | ................... | H04L 1/007 |
| | | | | 714/748 |
| 2016/0006579 A1* | 1/2016 | Lamb | ................. | H04L 12/4625 |
| | | | | 370/254 |

OTHER PUBLICATIONS

IEEE Std 802.1Qbb, "Standard for Local and metropolitan area networks—IEEE Standard for Local and metropolitan area networks, Media Access Control (MAC) Bridges and Virtual Bridged Local Area Networks—Amendment 17: Priority-based Flow Control", 40 pages, Sep. 30, 2011.

* cited by examiner

PHYSICAL-LAYER SIGNALING OF FLOW CONTROL UPDATES

FIELD OF THE INVENTION

The present invention relates generally to data communications, and particularly to control of data flow over a communication link.

BACKGROUND

Ethernet is a family of computer network standards that are widely used in wired local area networks (LANs). These standards have been codified by the IEEE 802.3 working group and define a wide range of link-layer protocol features and medium access control (MAC) functions. The Ethernet link-layer protocol may run over a variety of underlying physical-layer (PHY) types and protocols.

For full-duplex links, Annex 31B of the IEEE 802.3 specification defines an optional flow control operation using "PAUSE" frames. When the receiver on a given link transmits a PAUSE frame to the transmitter, it causes the transmitter to temporarily stop all transmission on the link (except certain control frames) for a period of time that is specified in the PAUSE frame. This pause mechanism enables the receiver to recover from states of congestion.

Recently, a number of new IEEE standards for data center bridging (DCB) have been proposed, offering enhanced Ethernet flow control capabilities. For example, the IEEE 802.1Qbb project authorization request (PAR) provides priority-based flow control (PFC) as an enhancement to the pause mechanism described above. PFC creates eight separate virtual links on a given physical link and allows the receiver to pause and restart the virtual links independently. PFC thus enables the operator to implement differentiated quality of service (QoS) policies for the eight virtual links.

A variety of protocols exist for error detection and control over a physical network link. For this purpose, an error-detecting code, such as a cyclic redundancy check (CRC) code, is generally added to each data block that is transmitted over the link. The receiver checks each incoming data block for errors and, upon detecting an error, sends an automatic repeat request (ARQ) to the transmitter, which then retransmits the required data block or blocks. In hybrid ARQ (HARQ) schemes, the transmitter adds a forward error correction (FEC) code, such as a Reed-Solomon code, to each data block. Upon detecting an error, the receiver first attempts to correct the error using the FEC code. The receiver sends an ARQ to the transmitter only when error correction is not possible. HARQ thus performs better than simple ARQ on noisy links, which experience frequent bit errors, but may still require retransmission of many data blocks as signal conditions deteriorate. ARQ and HARQ schemes are most often implemented in the link layer, but both PHY and higher-layer implementations are also known in the art.

SUMMARY

Embodiments of the present invention that are described hereinbelow provide improved methods and circuits for link-level flow control.

There is therefore provided, in accordance with an embodiment of the invention, a method for communication, which includes transmitting a sequence of outgoing data blocks from a network node over a communication link to a peer node, and receiving at the network node incoming data blocks from the peer node. A control field is added in a predefined location in each of the outgoing data blocks in the sequence before transmission of each of the data blocks by the network node, such that in at least a first subset of the outgoing data blocks in the sequence, the control field contains error control information, which is capable of causing the peer node to retransmit one or more of the incoming data blocks to the network node, while in at least a second subset of the outgoing data blocks in the sequence, disjoint from the first subset, the control field contains a flow control instruction, configured to cause the peer node to alter a rate of transmission of the incoming data blocks over the link.

In a disclosed embodiment, adding the control field includes adding an automatic repeat request (ARQ) header to each of the outgoing data blocks, including a plurality of fields including the control field. Typically, the plurality of the fields in the header includes a negative acknowledgment (NACK) field, indicating to the peer node that an error was detected in data received from the peer node, while the control field contains a sequence number of one of the incoming data blocks received from the peer node, indicating a point in the sequence from which the peer node is to begin retransmission of the incoming data blocks.

In some embodiments, the flow control instruction includes a pause instruction to the peer node to pause the transmission of the incoming data blocks for a specified time period. In one embodiment, the pause instruction includes a priority-based flow control (PFC) vector, which provides respective pause instructions for each of a plurality of virtual links. Typically, the method includes, at the peer node, pausing the transmission of at least some of the incoming data blocks in response to the pause instruction, without checking for a link-layer pause frame in the outgoing data blocks.

In a disclosed embodiment, the control field is added to the outgoing data blocks by a physical-layer (PHY) interface of the network node, which is coupled to the communication link and generates the error control information, and adding the control field includes substituting, by the PHY interface, the flow control instruction for the error control information in response to a signal from a link-layer interface of the network node to the PHY interface, indicating that a flow control action is required.

Additionally or alternatively, transmitting the sequence of the outgoing data blocks includes transmitting a plurality of the outgoing data blocks in the second subset interleaved in alternation with the outgoing data blocks in the first subset in order to convey the flow control instruction to the peer node.

There is also provided, in accordance with an embodiment of the invention, communication apparatus, which includes a buffer, configured to hold data transmitted over a communication link. A communication interface is coupled to the buffer and configured to transmit a sequence of outgoing data blocks from a network node over a communication link to a peer node and to receive incoming data blocks from the peer node, while adding a control field in a predefined location in each of the outgoing data blocks in the sequence, such that in at least a first subset of the outgoing data blocks in the sequence, the control field contains error control information, capable of causing the peer node to retransmit one or more of the incoming data blocks, while in at least a second subset of the outgoing data blocks in the sequence, disjoint from the first subset, the control field contains a flow control instruction, configured to cause the peer node to alter a rate of transmission of the incoming data blocks over the link.

The present invention will be more fully understood from the following detailed description of the embodiments thereof, taken together with the drawings in which:

DETAILED DESCRIPTION OF EMBODIMENTS

For link-layer flow control interactions to work efficiently, it is important that updates, such as Ethernet pause packets, be delivered promptly from the issuing node to the peer node. If delivery is delayed, the peer node will continue sending packets over the link for some time after the pause packet has been issued, possibly resulting in buffer overflow and packet discard at the issuing node.

When an error control scheme that includes automatic retransmission (such as ARQ or HARQ) is used on a given link, retransmission of data blocks can result in delays in the delivery of the link-layer flow control packets. This problem can become particularly acute when the retransmission protocol is implemented in the physical layer on a noisy link, which is prone to frequent bit errors. When a data error occurs, the PHY interfaces of the nodes on the link will delay transmission of all data blocks, including pause frames issued by the link-layer interfaces, until the necessary retransmission has been completed. The packet loss caused by the delayed delivery of the pause frame results in reduction of the effective bandwidth of the link.

Embodiments of the present invention that are described herein provide an enhanced combination of error control and flow control functions that enhances link efficiency and can be useful in resolving the problem of delayed delivery of flow control instructions. In the disclosed embodiments, the PHY interface of a network node transmits a sequence of outgoing data blocks over a communication link to a peer node and receives incoming data blocks from the peer node. In each of the outgoing data blocks in the sequence, the network node adds a control field in a predefined location. This control field is used for error control in some data blocks and flow control in others. When the link-layer interface of the network node issues a flow control instruction, the PHY interface immediately inserts the flow control information into the control field of at least some of the data blocks that it transmits. As a result, the network node is relieved of the need to queue and transmit a dedicated flow control packet, and the peer node receives the flow control instruction without delay, by parsing the information in the control field.

Figure 1:
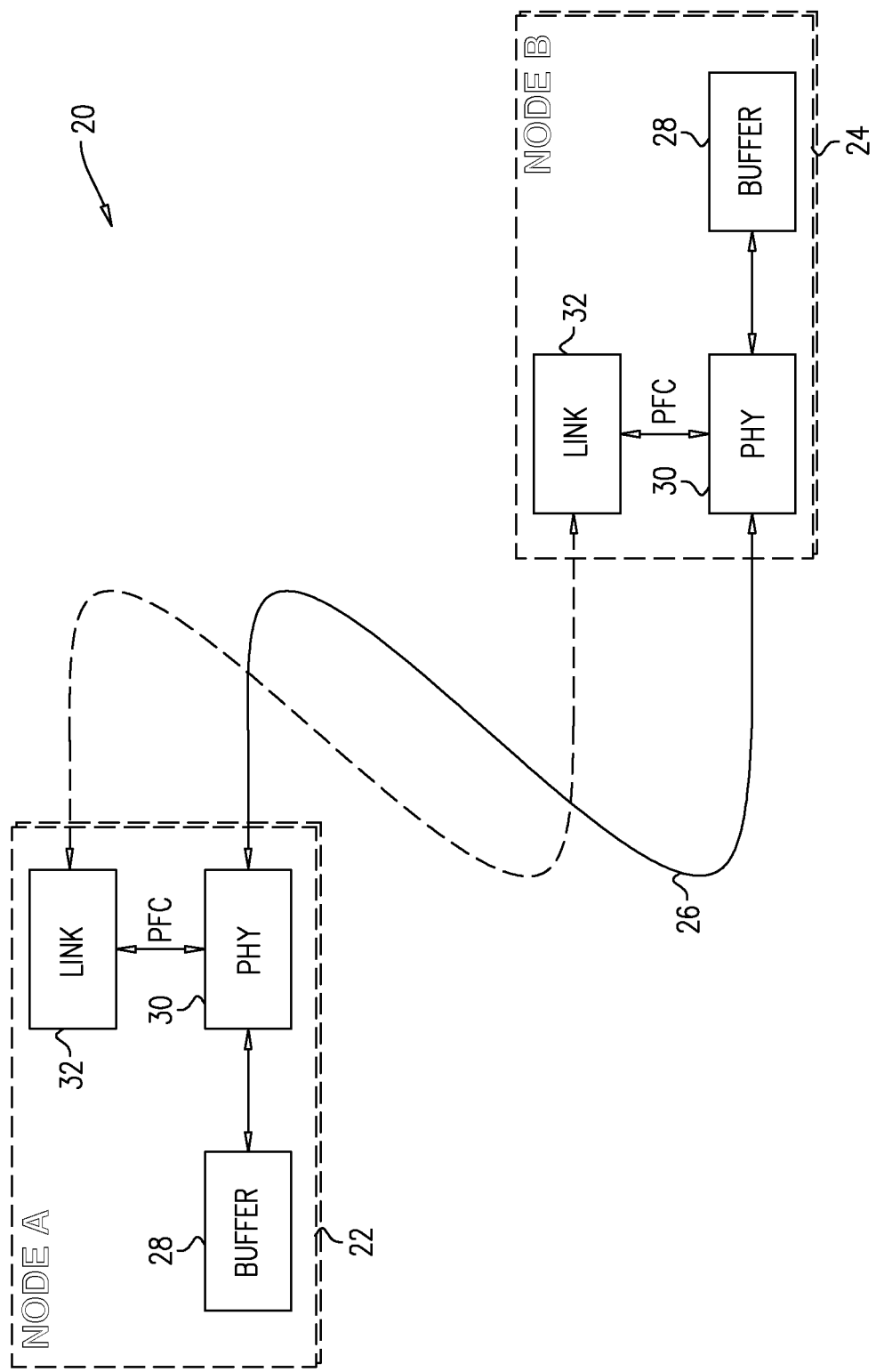
FIG. 1 is a block diagram that schematically illustrates a data communication system, in accordance with an embodiment of the invention.

FIG. 1 is a block diagram that schematically illustrates a data communication system 20, in accordance with an embodiment of the invention. System 20 comprises two network nodes 22 (NODE A) and 24 (NODE B), which are connected by a packet data link 26. Nodes 22 and 24 may comprise substantially any sort of network elements, such as switches or network interface controllers. For the sake of simplicity, only the few components of nodes 22 and 24 that are required for an understanding of certain embodiments of the present invention are shown and described here. Those skilled in the art will understand how these components can be integrated into the ports of a complete switch or other network element.

Nodes 22 and 24 each comprise a buffer 28, comprising a memory that holds data transmitted over link 26, and a communication interface, coupled to the buffer. The communication interface typically comprises a PHY interface 30 and a link-layer interface 32 (and possibly higher-level interfaces, not shown in the figures). PHY interfaces 30 transmit respective sequences of outgoing data blocks over link 26 and receive incoming data blocks to and from one another. Link-layer interfaces 32 communicate with one another by transmitting and receiving packets, including link-layer headers and payloads, which are carried as data in the blocks transmitted and received between PHY interfaces 30. In addition, link-layer interfaces 32 exchange flow control instructions, such as PFC information, by means of internal signaling to and from the corresponding PHY interfaces 30, as described in detail hereinbelow.

Link 26 may comprise any suitable sort of network cable, such as a copper wire or fiberoptic cable, or even a wireless link. In the present example, it is assumed that link 26 is a high-speed Ethernet link, and that interfaces 30 and 32 are compatible with applicable Ethernet standards, as provided by the IEEE 802.3 family of standards. (The techniques described herein for physical-layer error control and signaling of flow control instructions, however, are not a part of these standards.) Alternatively, the principles of the present invention may be applied, mutatis mutandis, to other sorts of communication protocols and standards, as are known in the art.

Interfaces 30 and 32 typically comprise hardware logic, similar to that found in network ports that are known in the art, with the addition of circuits for carrying out the novel error control and flow control signaling functions that are described herein. The modifications needed in the design of existing port components in order to integrate these novel functions will be apparent to those skilled in the art after reading the present description. Alternatively, some of the functions of link-layer interface 32 may be carried out by a suitable processor based on firmware or software instructions.

Figure 2:
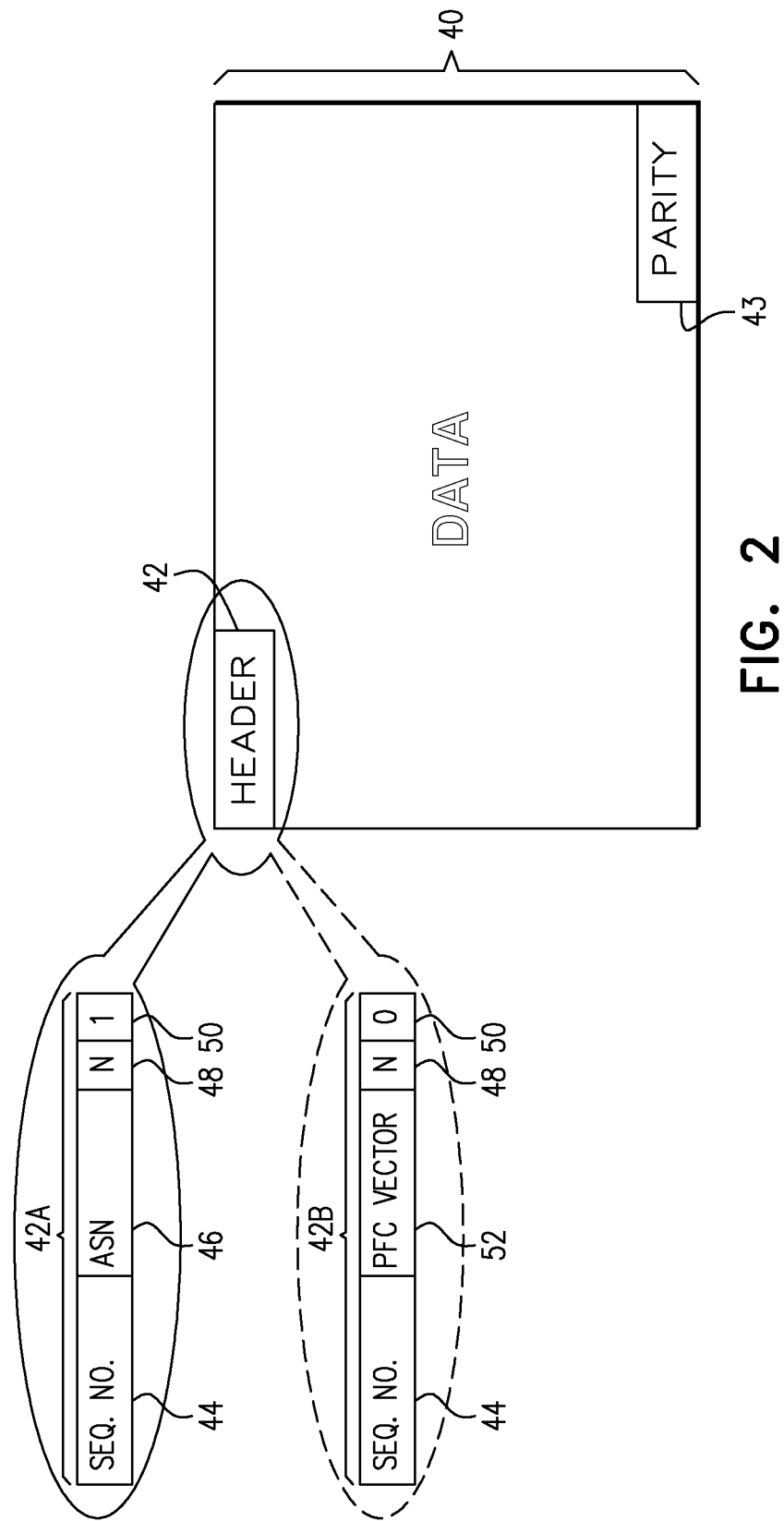
FIG. 2 is a block diagram that schematically illustrates a data block, in accordance with an embodiment of the invention.

FIG. 2 is a block diagram that schematically illustrates a data block 40 that is transmitted over link 26, in accordance with an embodiment of the invention. Block 40 typically comprises a fixed quantity of data, with a header 42, comprising a number of control fields, and a parity field 43, containing an error detection or error correction code. Block 40 could alternatively be referred to as a "frame" or "cell," but the term "block" is used herein to emphasize that it is a physical-layer construct, in distinction to the link-layer constructs, such as frames, cells, or packets, that are carried over link 26 between interfaces 32. As noted earlier, the contents of the link-layer constructs, including link-layer and higher-layer headers and payloads, are carried between nodes 22 and 24 in the data section of blocks 40.

Header 42 is shown in two variants: an ARQ header 42A for error control, and a PFC header 42B for flow control. ARQ header 42A (which is also appropriate when HARQ is used) contains a number of control fields, including:

A sequence number 44, which is assigned to each block 40 by PHY interface 30 of the transmitting node;

An acknowledgment sequence number (ASN) 46, which is inserted by PHY interface 30 to indicate the sequence number of the last block received from the peer node;

A negative acknowledgment (NACK) field 48, containing a flag that is set to indicate to the peer node that an error was detected in data received from the peer node, and thus request retransmission; and A flow control flag 50, which indicates whether header 42 is an ARQ header or a PFC header. In the pictured example, flag 50 is set to '1' in ARQ header 42A and to '0' in PFC header 42B.

For each incoming data block 40, PHY interface 30 computes an error correction result over the data and compares it to the value in parity field 43. In the event of a discrepancy that the receiving node is unable to correct, the NACK flag in field 48 is set in order to request retransmission. The value in ASN field 46 indicates the point in the sequence from which the peer node is to begin retransmission of the data blocks.

Normally, as long as link-layer interface 32 does not require flow control service, blocks 40 contain header 42A, in which field 46 contains error control information (i.e., the ASN). When flow control service is requested by the link-layer interface, PHY interface 30 applies PFC header 42B to a subset of blocks 40 that it transmits, while the remaining subset, disjoint from this flow control subset, continues to contain header 42A. In header 42B, ASN field 46 is replaced by a flow control field 52, containing a flow control instruction, which causes the peer node to alter its rate of transmission of data blocks over link 26. For example, field 52 may contain a PAUSE opcode and an indication of the time period during which the peer node is requested to refrain from transmission.

Alternatively, in the example shown in FIG. 2, field 52 in header 42B contains a PFC vector, such as a vector of eight bits, with one bit corresponding to each virtual link (i.e., each class of service) on physical link 26. Each bit is set or reset to indicate to the peer node whether to pause or transmit data blocks on the corresponding virtual link. In this case, the specified pause time may be set to a default value, and the pause instruction may be renewed or canceled by the bit values in field 52 in subsequent data blocks. For example, the default pause time may be set to a large value, so that when a given virtual link is paused, it will typically remain idle until the peer node receives a subsequent block in which the PFC vector in field 52 indicates that transmission on this virtual link is to resume. Alternatively, a larger vector may be inserted in field 52 to signal actual pause times per virtual link.

As another alternative, field 52 may contain other sorts of flow-control instructions, in accordance with other techniques of flow control that are known in the art. For example, if link-layer interfaces 32 support a credit-based flow control scheme, field 52 may be used to convey credits.

Although the embodiments described herein relate particularly to flow control signaling, the principles of the present invention may alternatively be applied to provide other sorts of sideband signaling over a sequence of data blocks. In such cases, field 52 will carry information relating to other protocol functions, in addition to or instead of flow control information. For example, field 52 may be used to inform the peer node of an increase or decrease in error correction capability or of changes in the transmission bandwidth for s purposes of power saving.

Figure 3:
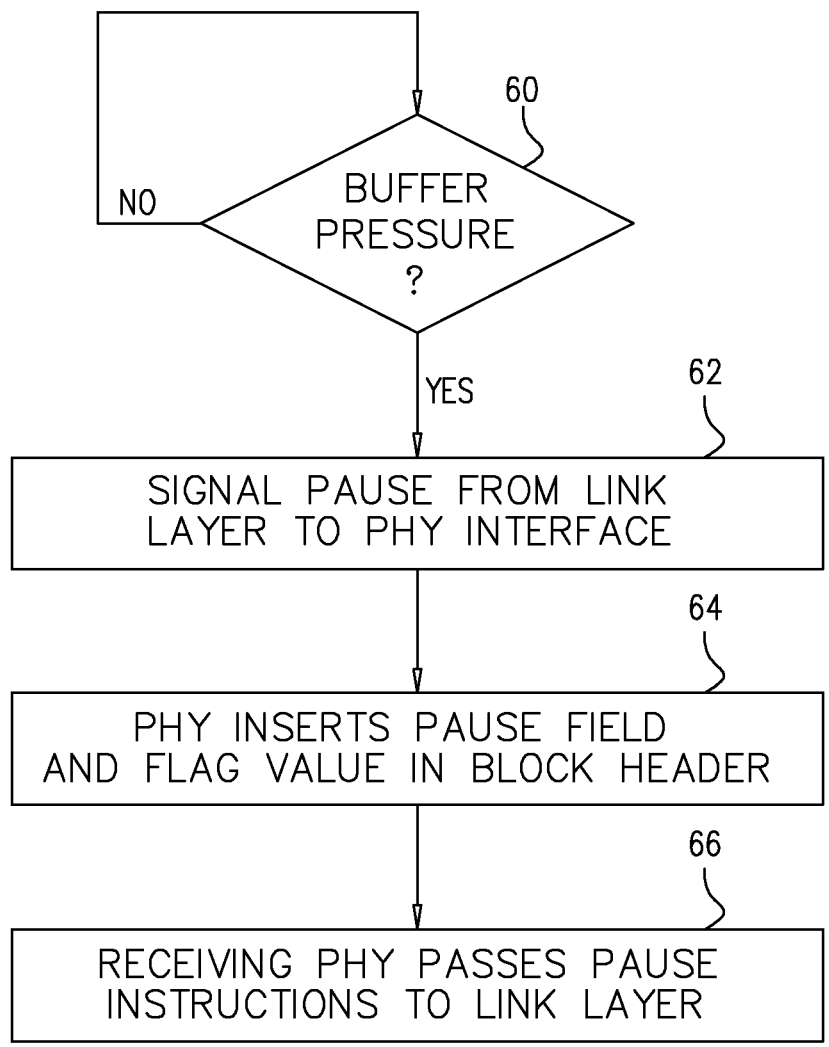
FIG. 3 is a flow chart that schematically illustrates a method for flow control, in accordance with an embodiment of the invention.

FIG. 3 is a flow chart that schematically illustrates a method for flow control, in accordance with an embodiment of the invention. The method is described, for the sake of convenience and clarity, with reference to the elements of system 20 that are shown in FIG. 1 and the structure of block 40 that is shown in FIG. 2. Alternatively, the principles of this method may be applied by network nodes of other types, using other sorts of block structures that contain the appropriate sorts of control fields, as described herein. All such alternative implementations are considered to be within the scope of the present invention.

Link-layer interface 32 (or another component of node 22) monitors the fill level of buffer 28, at a buffer pressure monitoring step 60. As long as the fill level does not rise above a predefined threshold, no flow control action is required, and PHY interface 30 inserts ARQ header 42A in all blocks 40 that it transmits. Upon encountering buffer pressure, however, link-layer interface 32 computes pause parameters (determining, for instance, which classes of service should be paused) and generates a pause signal accordingly to PHY interface 30, at a pause signaling step 62. The signal indicates to PHY interface 30 that a certain flow control action is required. Referring to the example described above, the pause signal may indicate the values of the bits that are to be inserted in the PFC vector in flow control field 52.

Upon receiving the pause signal from link-layer interface 32, PHY interface 30 selects a subset of the outgoing data blocks 40 in its queue for transmission over link 26 and inserts PFC header 42B into these blocks in place of ARQ header 42A, at a pause field insertion step 64. PHY interface 30 thus substitutes the flow control instruction provided by field 52 for the error control information normally provided in field 46. In the blocks containing PFC header 42B, PHY interface 30 also sets flow control flag 50 to inform the receiving node that header 42 in this block contains flow control information.

In order to ensure that the flow control instructions are received by node 24, PHY interface 30 may insert header 42B in multiple data blocks 40 in the sequence that it transmits over link 26. For example, header 42B may be inserted in a succession of ten data blocks, or any other suitable number of data blocks. (The number may be preset in the configuration of nodes 22 and 24.) Node 24 need not receive the error control acknowledgment provided by field 46 in every data block, but on the other hand, it is not desirable that many data blocks go by without such an acknowledgment. Therefore, at step 64, flow PHY interface 30 typically interleaves the outgoing data blocks in the subset containing header 42B in alternation with those in the subset containing header 42A. Thus, the data blocks with flow control information alternate with those containing error control information.

PHY interface 30 in node 24 receives data blocks 40 in this sequence, and passes the flow control instructions from headers 42B to link layer interface 32, at an instruction reception step 66. Link layer interface 32 pauses transmission of data packets to link 26 according to the instructions, without having to check for an actual link-layer pause frame in the sequence of data blocks received from node 22. Even if the data in the received blocks are corrupted (as indicated by a mismatch between the received data and parity field 43), and the data must therefore be discarded, PHY interface 30 will still parse and act upon the ARQ or flow control information contained in header 42. Thus, node 24 will respond to both retransmission requests and flow control instructions promptly and reliably, notwithstanding the use of the same control field in header 42 by the ARQ and flow control protocols.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving at a network node incoming data blocks from a peer node, over a communication link;
monitoring a fill level of a buffer that holds data from the incoming data blocks;
providing a sequence of outgoing data blocks by a link-layer interface of the network node;
adding, by a physical-layer (PHY) interface of the network node, a control field in a predefined location in each of the outgoing data blocks in the sequence, such that as long as the fill level of the buffer does not rise above a given threshold, the control field in the outgoing data blocks in the sequence contains error control information, which is capable of causing the peer node to retransmit one or more of the incoming data blocks to the network node, while when the fill level of the buffer rises above the given threshold, the control field in at least a subset of the outgoing data blocks in the sequence contains, instead of the error control information, a flow control instruction, configured to cause the peer node to alter a rate of transmission of the incoming data blocks over the link; and
transmitting the provided data blocks of the sequence, with the added control field, from the network node to the peer node.

2. The method according to claim 1, wherein adding the control field comprises adding an automatic repeat request (ARQ) header to each of the outgoing data blocks, comprising a plurality of fields including the control field.

3. The method according to claim 2, wherein the plurality of the fields in the header comprises a negative acknowledgment (NACK) field, indicating to the peer node that an error was detected in data received from the peer node, while the control field contains a sequence number of one of the incoming data blocks received from the peer node, indicating a point in the sequence from which the peer node is to begin retransmission of the incoming data blocks.

4. The method according to claim 1, wherein the flow control instruction comprises a pause instruction to the peer node to pause the transmission of the incoming data blocks for a specified time period.

5. The method according to claim 4, wherein the pause instruction comprises a priority-based flow control (PFC) vector, which provides respective pause instructions for each of a plurality of virtual links.

6. The method according to claim 4, and comprising, at the peer node, pausing the transmission of at least some of the incoming data blocks in response to the pause instruction, without checking for a link-layer pause frame in the outgoing data blocks.

7. The method according to claim 1, wherein the physical-layer (PHY) interface of the network node is coupled to the communication link and generates the error control information, and wherein adding the control field comprises substituting, by the PHY interface, the flow control instruction for the error control information in response to a signal from the link-layer interface of the network node to the PHY interface, indicating that a flow control action is required.

8. The method according to claim 1, wherein transmitting the sequence of the outgoing data blocks comprises transmitting a plurality of the outgoing data blocks in the subset containing the flow control instruction interleaved in alternation with the outgoing data blocks containing the error control information in order to convey the flow control instruction to the peer node.

9. Communication apparatus, comprising:
a buffer, configured to hold data transmitted over a communication link; and
a communication interface, coupled to receive incoming data blocks from a peer node, over a communication link, to monitor a fill level of the buffer;
a link-layer interface configured to provide a sequence of outgoing data blocks; and
a physical-layer (PHY) interface configured to add a control field in a predefined location in each of the outgoing data blocks in the sequence, such that as long as the fill level of the buffer does not rise above a given threshold, the control field in the outgoing data blocks in the sequence contains error control information, capable of causing the peer node to retransmit one or more of the incoming data blocks, while when the fill level of the buffer rises above the given threshold, the control field in at least a subset of the outgoing data blocks in the sequence contains, instead of the error control information, a flow control instruction, configured to cause the peer node to alter a rate of transmission of the incoming data blocks over the link,
wherein the communication interface is further configured to transmit the provided data blocks of the sequence, with the added control field to the peer node.

10. The apparatus according to claim 9, wherein the communication interface is configured to add an automatic repeat request (ARQ) header to each of the outgoing data blocks, comprising a plurality of fields including the control field.

11. The apparatus according to claim 10, wherein the plurality of the fields in the header comprises a negative acknowledgment (NACK) field, indicating to the peer node that an error was detected in data received from the peer node, while the control field contains a sequence number of one of the incoming data blocks received from the peer node, indicating a point in the sequence from which the peer node is to begin retransmission of the incoming data blocks.

12. The apparatus according to claim 9, wherein the flow control instruction comprises a pause instruction to the peer node to pause the transmission of the incoming data blocks for a specified time period.

13. The apparatus according to claim 12, wherein the pause instruction comprises a priority-based flow control (PFC) vector, which provides respective pause instructions for each of a plurality of virtual links.

14. The apparatus according to claim 12, wherein the pause instructions causes the peer node to pause the transmission of at least some of the incoming data blocks without checking at the peer node for a link-layer pause frame in the outgoing data blocks.

15. The apparatus according to claim 9, wherein the PHY interface generates the error control information and adds the control field to the outgoing data blocks, and wherein the PHY interface substitutes the flow control instruction for the error control information in response to a signal from the link-layer interface to the PHY interface, indicating that a flow control action is required.

16. The apparatus according to claim 9, wherein the communication interface is configured to transmit a plurality of the outgoing data blocks in the subset containing the flow control instruction interleaved in alternation with the outgoing data blocks containing the error control information in order to convey the flow control instruction to the peer node.

\* \* \* \* \*